United States Patent
Lande et al.

(10) Patent No.: US 6,665,643 B1
(45) Date of Patent: Dec. 16, 2003

(54) METHOD OF AND APPARATUS FOR ANIMATION, DRIVEN BY AN AUDIO SIGNAL, OF A SYNTHESIZED MODEL OF A HUMAN FACE

(75) Inventors: Claudio Lande, Turin (IT); Mauro Quaglia, Montalenghe (IT)

(73) Assignee: Telecom Italia Lab S.P.A., Turin (IT)

( * ) Notice: Subject to any disclaimer, the term of this patent is extended or adjusted under 35 U.S.C. 154(b) by 0 days.

(21) Appl. No.: 09/407,027

(22) Filed: Sep. 28, 1999

(30) Foreign Application Priority Data

Oct. 7, 1998 (IT) .......................... TO98A0842

(51) Int. Cl.[7] .......................... G10L 13/04; G06T 15/70
(52) U.S. Cl. .................. 704/266; 704/270; 704/277; 345/474
(58) Field of Search .............................. 704/258, 260, 704/263, 269, 270, 276, 277; 345/473, 474, 475

(56) References Cited

U.S. PATENT DOCUMENTS

| | | | | | |
|---|---|---|---|---|---|
| 4,841,575 | A | * | 6/1989 | Welsh et al. ................ 382/100 |
| 5,608,839 | A | * | 3/1997 | Chen ......................... 704/231 |
| 5,657,426 | A | * | 8/1997 | Waters et al. ............... 704/270 |
| 5,995,119 | A | * | 11/1999 | Cosatto et al. .............. 345/473 |
| 6,112,177 | A | * | 8/2000 | Cosatto et al. .............. 704/260 |
| 6,122,616 | A | * | 9/2000 | Henton ...................... 704/258 |
| 6,130,679 | A | * | 10/2000 | Chen et al. ................. 345/473 |
| 6,154,222 | A | * | 11/2000 | Haratsch et al. ............ 345/473 |
| 6,177,928 | B1 | * | 1/2001 | Basso et al. ................ 704/200 |
| 6,208,356 | B1 | * | 3/2001 | Breen et al. ................ 345/473 |
| 6,250,928 | B1 | * | 6/2001 | Poggio et al. .............. 345/473 |
| 6,330,023 | B1 | * | 12/2001 | Chen ....................... 348/14.13 |

\* cited by examiner

*Primary Examiner*—Richemond Dorvil
*Assistant Examiner*—Abul K. Azad
(74) *Attorney, Agent, or Firm*—Herbert Dubno

(57) ABSTRACT

A method and an apparatus for the animation, driven by an audio signal, of a synthesised human face model are described, that allow the animation of any model complying with the ISO/IEC standard 14496 ("MPEG-4 standard"). The concerned phonemes are derived from the audio signal, and the corresponding visemes are identified within a set comprising both visemes defined by the standard and visemes typical of the language. Visemes are split into macroparameters that define shape and positions of the mouth and jaw of the model and that are associated to values indicating a difference from a neutral position. Such macroparameters are then transformed into face animaton parameters complying with the standard, the values of which define the deformation to be applied to the model in order to achieve animation.

6 Claims, 1 Drawing Sheet

METHOD OF AND APPARATUS FOR ANIMATION, DRIVEN BY AN AUDIO SIGNAL, OF A SYNTHESIZED MODEL OF A HUMAN FACE

FIELD OF THE INVENTION

This invention concerns audio-visual or multimedia communication systems and in particular a method and an apparatus for the animation, driven by parameters derived from audio sources, of a synthesized human face model.

BACKGROUND OF THE INVENTION

At present, development activities for multimedia applications are considering the integration of natural and synthetic audio-visual objects with increasing interest, in order to facilitate and improve user application interaction. In such an area, adopting anthropomorphic models to facilitate the man-machine interaction is envisaged. Such interest has been also perceived by international standardization bodies, and the ISO/IEC standard 14496, "Generic Coding of Audio-Visual Objects", has entered at present its definition phase. Said standard, which is commonly known as the "MPEG-4 standard" and is hereinafter referred to by such term, is aimed among other things at providing a reference framework for said applications.

Regardless of the specific solutions given by the MPEG-4 standard, the anthropomorphic models are thought of as an ancillary means to other information streams and are seen as objects capable of animation, where the animation is driven, by way of an example, by audio signals, such as the voice. In that case it is necessary to develop animation systems that, in synchronism with the voice itself, can deform the geometry and the look of the models in such a way that the synthetic faces take up typical countenances related to speech. The requisite target is a talking head or face that has a look as much as possible close to reality.

The application contexts of animated models of that kind may range from Internet applications, such as welcome messages or on line assistance messages, to co-operative work applications (for instance, electronic mail readers), as well as to professional applications, such as the implementation of post-production effects in the film and TV industry, to video games, and so on.

The models of human faces are generally implemented starting from a geometric representation formed by a 3-D mesh structure or "wire frame". The animation is based on the application in sequence and without interruption of appropriate deformations of the polygons forming the mesh structure (or of a subset of such polygons) to such way as to achieve the required effect during the display phase, in a specific case, movement of the jaw and lip region.

The solution defined-by the MPEG-4 standard envisages for such a purpose the use of a set of face animation parameters, defined independently of the model, so as to ensure the interworking of the systems. This set of parameters is organized on two layers: the upper layer is formed by the so called "visemes" which represent the positions of the speaker's mouth in correspondence with the phonemes (i.e. the elementary sound units); the lower layer represents instead the elementary deformations to be applied in correspondence with the different visemes. The standard precisely defines how lower layer parameters must be used, whereas it does not set constraints on the use of upper layer parameters. The standard defines a possible association between phonemes and visemes for the voice driven animation; thereafter relating parameters shall have to be applied to the model adopted.

Different methods of achieving animation are known from the literature. By way of an example, one can mention the following papers: "Converting Speech into Lip Movements: A Multimedia Telephone for Hard of Hearing People", by F. Lavagetto, IEEE Transactions on Rehabilitation Engineering, Vol.3, No. 1, March 1995; DIST, University of Genoa, "Description of algorithms for Speech-to-Facial Movements Transformations", ACTS "SPLIT" Project, November 1995; TUB, Technical University of Berlin, "Analysis and Synthesis of Visual Speech Movements, ACTS "SPLIT" Project, November 1995.

The first document describes the possibility of implementing animation starting from phonemes, by identifying the visemes associated and transforming the visemes into articulatory parameters to be applied to a model; alternatively it suggests the direct transformation of spectral information into articulatory parameters through a neural network adequately trained. However the adopted articulatory parameters are not the facial animation parameters envisaged by MPEG-4 standard and therefore the suggested method is not flexible. Also the two papers presented at the ACTS "SPLIT" Project do not describe the use of facial animation parameters foreseen by MPEG-4 standard; further the obtained parameters are only aimed at choosing an image from a database containing images of lips in different-positions {corresponding to the various visemes).

SUMMARY OF THE INVENTION

According to this invention, a method and an apparatus for animation are provided that are able to receive visemes and to apply the appropriate, geometric deformations to any facial model complying with MPEG-4 standard. Besides assuring a much higher quality, this allows the user to observe the synthetic speaker in positions different from the frontal one, to move closer to or away from it, etc.

More particularly; the invention provides a method wherein the driving audio signal is converted into phonetic data readable by a machine and such data are transformed into parameters representative of elementary deformations to be applied to such model, and wherein the transformation of phonetic data includes the following steps: associating individual items of phonetic information or groups of phonetic information items (visemes) representative of a corresponding position of the speaker's mouth, said visemes being selected within a set which comprises visemes independent of the language of the driving audio signal and visemes specific for such a language;

splitting each viseme into a group of macroparameters characterizing the mouth shape and the positions of lips and jaw, and associating each of the macroparameters of a given viseme with an intensity value representative of a displacement from a neutral position and selected within an interval determined in an initialization phase so as to guarantee a good naturalness of the animated model;

splitting the macroparameters into said parameters representative of deformations to be applied to a face model, which parameters are selected within a group of standard facial animation parameters relating to the mouth movements, and associating said parameters with intensity values which depend on the intensity values of macroparameters and which are also selected within an interval designed to guarantee the naturalness of the animated model.

The invention also concerns the apparatus for the implementation of the method, comprising:

means for generating phonetic information representative of the driving audio signal, readable by a machine; means for converting the phonetic information into parameters representative of elementary deformations to be applied to such a model, said conversion means being capable of: associating individual phonetic information items or groups of phonetic information items with respective information items (visems} representative of a corresponding mouth position in the synthesized model, the visemes being read from a memory containing visemes independent of the language of the driving audio signal and visemes specific for such a language; splitting each viseme into a group of macroparameters characterizing mouth shape and positions of lips and jaw in the model; associating each of the macroparameters of a given viseme with an intensity value representative of a displacement from a neutral position and selected within a given interval in an initialization phase so as to guarantee a good naturalness of the animated model; splitting the macroparameters into parameters representative of deformations to be applied to such a model, which parameters are selected within a group of standard facial animation parameters relating to mouth movements; associating said parameters with intensity values which depend on the intensity values of the macroparameters and which also are selected within an interval designed to guarantee the, naturalness of the animated model, and means for applying the parameters to the model, under control of the means for the generation of phonetic information.

In the paper "Lips and Jaw Movements for Vowels and Consonants: Spatio-Temporal Characteristics and Bimodal Recognition Applications" by P. Cosi and E. Magno Caldognetto, presented at the NATO-ASI Workshop on Speech Reading (Bonas, France, Aug. 28 to Sep. 10, 1995) and published in "Speech Reading by Human Machines" edited by D. G. Stork, M: E. Henneke, NATO—ASI Series 150, Berlin, Springer-Verlag, 1996, pages 291 to 314, the possibility is mentioned of characterizing a viseme through four macro-parameters, namely:

mouth width (hereinafter referred to as LOW from the initials of Lip Opening Width)

vertical distance between lips (hereinafter referred to as LOH, from the initials of Lip Opening Height)

jaw opening (hereinafter indicated as JY)

lip protrusion (hereinafter indicated as LP) and it is said in general that each of those macro-parameters is associated to an intensity value. Nevertheless, the above-cited paper essentially concerns the study of interactions between voice and facial movements and does not envisage the application of results to the facial animation, for which the actual knowledge of the intensity values is an essential condition for the achievement of an animated model which is as natural as possible.

BRIEF DESCRIPTION OF THE DRAWING

To better clarify the invention, reference is made to the attached drawing; where.

SPECIFIC DESCRIPTION

Figure 1:
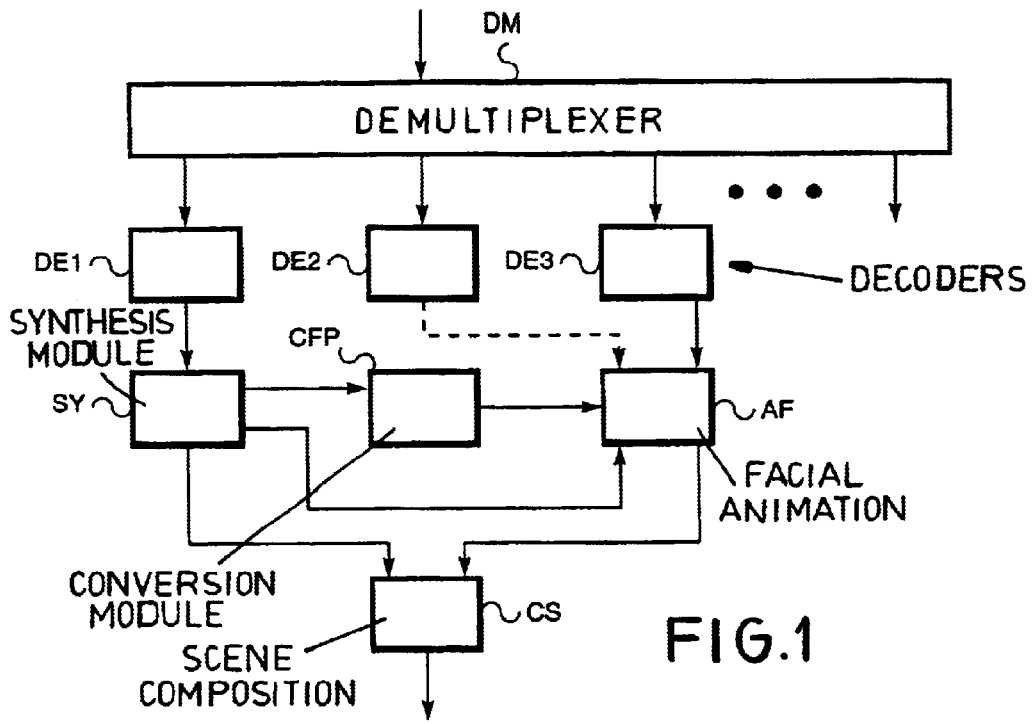
FIG. 1 is a block diagram of an animation system which makes use of the invention.

FIG. 1 shows the insertion of a facial animation system into an MPEG-4 decoder. In general, an MPEG-4 decoder includes a demultiplexer DM which receives a composite stream containing a number of elementary streams, each relating to a component of a multimedia signal representing the coding of a given scene, splits the composite stream into its individual streams and provides them to respective decoders DE1, DE, DE3 . . .

In the case of interest for this invention, in which the scene to be rendered includes a synthesized image of a human face that has to be animated on the basis of a given text, these elementary streams concern at least some of the following information: text; the animation parameters (FAP=Facial Animation Parameters); parameters (known as facial definition parameters or FDP), to be used for calibrating the specific facial model to which animation will be applied.

To perform animation, resort can be made to two general solutions:

The first solution envisages that, during the coding phase, the scene of interest is processed in such a way as to cause the transmission to the decoder of a composite stream including both the audio channel and the relating animation parameters, together with the time information (time stamps) required for synchronization between speech and animation. All information required for the animation is therefore already included in the coded stream, and the decoder must only provide for reconstruction of the scene by introducing the different objects (i.e. audio, animated image, background, etc).

The second solution leaves to the decoder the entire rendering of animation, starting from phonetic data extracted for instance from a text included in a coded stream, or extracted from a file or even provided by a voice recognizer, etc.

In both solutions the presence of information about the model (FDP) in the coded stream is optional.

The second solution is particularly interesting for use in a telecommunications network, since the bandwidth requirements for a text transmission are much lower than those for the direct transmission of a video channel and an audio channel associated to it (a few tens of characters, depending on text length, compared to a bandwidth from some kbit/s to some Mit/s).

Therefore the invention concerns a solution of this kind, and the figure illustrates the case in which the text for the animation is included in the coded stream.

The decoded text, provided for instance by decoder DE1, is supplied to a voice synthesizer SY of any known type, able to provide at the output both the phonemes (i.e. the elementary sound units) and the corresponding synthesized audio. As an example, it is assumed that the synthesizer being used is the synthesis system ELOQUENS™ of the Applicant, the characteristics of which are widely described in literature. More details on this synthesizer can be found e.g. in European Patent Application EP 0 706 170.

The phonemes are provided to a unit CFP for their conversion into the so called facial animation parameters, i.e. parameters defining elementary facial deformations. These parameters are in turn supplied to a facial animation module AF which upon control of the synthesis module SY, applies the required deformation to the model, by taking into account the information relating to the facial definition parameters received for instance from decoder DE3. The synthesized audio signal and the animated model are then sent to a scene composition module CS, which combines the animated model with the audio, inserts the background, etc.

The dotted line link between module AF and decoder DE2 schematizes the above-cited possibility of directly using animation parameters sent by the decoder.

It must be noted that, in order to obtain a natural animation, the scene composition module must guarantee a good synchronization between the model animation and the synthesizsed audio. Experience and studies have proven that the user does not perceive misalignments if the time distance between the lip movements of the model and the audio lies in the range −40 ms to +120 ms, and that quality is still acceptable if the time distance lies in the range —90 ms to +180 ms. As far as this aspect is concerned, it must also be specified that the synthesis module SY does not 25 generate phonemes in a continuous way, but it supplies groups of phonemes corresponding to the sentence or the part of the sentence which is read from the input text. As a consequence, facial animation module AF must keep track of which phoneme is being used at a given time. This is achieved through appropriate time information provided by synthesis module SY.

As has already been said, instead of being provided by a synthesis unit SY, the phonemes can be supplied by a voice recognizer, read from a file, received from a continuous stream, etc. The way in which the phonemes are generated, however, is not a part of this invention, which concerns the operations carried out by conversion module CFP.

Obviously, it is essential that such phonemes are represented in a form that allows their electronic processing. By way of an example, it may be assumed that the representation is based on the SAMPA alphabet (Speech Assessment Methods Phonetic Alphabet), which allows the representation of phonemes of a number of languages in a machine readable format. Substantially, SAMPA codes the symbols of the international phonetic alphabet (IPA) through 7-bit ASCII characters. More details about SAMPA are not required for the comprehension of this invention and may be found at the Internet site http://www.phon.ucl.ac.uk/home/sampa/home.htm.

Figure 2:
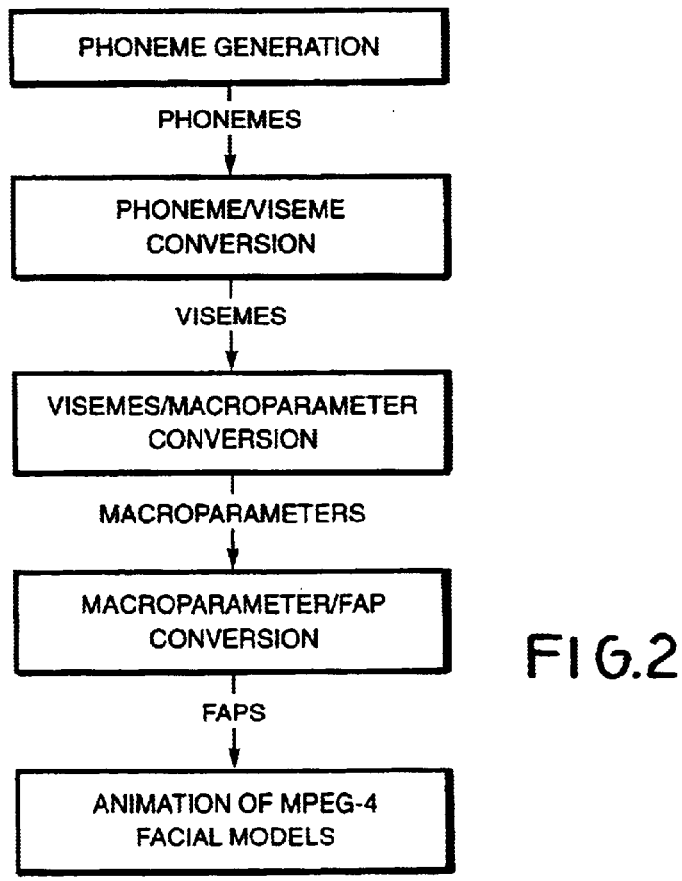
FIG. 2 is a general flow chart of the animation method according to the invention.

The general diagram of the process is represented in the flow chart of FIG. 2. The following description makes reference by way of an example to the Italian language. However, as previously stated, an alphabet such as SAMPA describes the phonemes of a number of languages and therefore it is straightforward for the technician to adapt what follows to a different language.

As can be seen, the first operation following the extraction of phonemes is their conversion into visemes. As has already been said, the MPEG-4 standard defines an association among groups of phonemes and visemes and in particular it defines 14 visemes that are associated to groups of phonemes which are common to many European languages. The visemes defined by such a standard are listed in Table 1, where the first column shows the viseme index according to the standard, the second one contains the phonemes associated to the viseme and the third one gives some examples of Italian language (or English language, for some phonemes) words containing such phonemes.

TABLE 1

| Viseme Index | Phonemes | Examples |
| --- | --- | --- |
| 1 | p, b, m | poi, bene, mai |
| 2 | f, v | f-ato, voce |
| 3 | T, D | think, that |
| 4 | t, dt | orta, d-ono |
| 5 | k, g | c-asa, g-as |
| 6 | tS, dZ, S | a-c-ido, z-aino, sc-i |
| 7 | s, z | s-aio, s-draio |
| 8 | n, I | n-ano, I-atte |

TABLE 1-continued

| Viseme Index | Phonemes | Examples |
| --- | --- | --- |
| 9 | r | o-r-ata |
| 10 | A: | c-a-mino |
| 11 | e | e-quinozio |
| 12 | I | i-gnoto |
| 13 | Q | t-o-tale |
| 14 | U | 1-u-cernario |

This group of visemes is supplemented, for languages requiring so (among which Italian language), by an additional group relating to stressed vowels. In particular for Italian language the following visemes have been introduced:

TABLE 2

| Viseme Index | Phoneme | Examples |
| --- | --- | --- |
| 15 | a | p-a-tto |
| 16 | E | s-e4va |
| 17 | i | r-i-to |
| 18 | 0 | t-o-ndo |
| 19 | u | t-u-tto |

The set of visemes which one requires for use is stored into an appropriate memory associated to CFP and addressed by the corresponding phoneme.

The next step is the characterization of such visemes through macroparameters. The invention makes use of the four macroparameters LOW, LOH, JY, LP mentioned before, and for each viseme it associates a value or intensity to each macroparameter. Such intensities have been identified in a preliminary operation phase starting from approximate values that have been determined in a heuristic way and have been gradually refined on the basis of subjective evaluations, aimed at improving the likelihood of the facial model animation. In particular, optimum intervals of intensity values have been defined, as shown in the following Table 3:

TABLE 3

| Viseme | LOH | JY | LOW | LP |
| --- | --- | --- | --- | --- |
| 1 | −88 ÷ −64 | 4 ÷ 12 | 14 ÷ 30 | 10 ÷ 22 |
| 2 | 58 ÷ 102 | 4 ÷ 15 | 66 ÷ 114 | −86 ÷ 46 |
| 3 | 188 ÷ 320 | 18 ÷ 36 | 13 ÷ 27 | 4 ÷ 12 |
| 4 | 225 ÷ 385 | 215 ÷ 365 | 53 ÷ 95 | −74 ÷ −40 |
| 5 | 107 ÷ 185 | 9 ÷ 21 | 116 ÷ 200 | 2 ÷ 8 |
| 6 | 353 ÷ 613 | 328 ÷ 568 | 13 ÷ 27 | 71 ÷ 125 |
| 7 | 203 ÷ 345 | 168 ÷ 286 | 19 ÷ 39 | 2 ÷ 6 |
| 8 | 28 ÷ 52 | 4 ÷ 12 | 14 ÷ 30 | 10 ÷ 22 |
| 9 | 42 ÷ 78 | 4 ÷ 12 | 22 ÷ 42 | 17 ÷ 35 |
| 10 | 304 ÷ 516 | 274 ÷ 464 | 28 ÷ 52 | −79 ÷ −43 |
| 11 | 274 ÷ 464 | 182 ÷ 310 | 28 ÷ 52 | −79 ÷ −43 |
| 12 | 244 ÷ 412 | 182 ÷ 310 | 28 ÷ 52 | 28 ÷ 52 |
| 13 | 244 ÷ 412 | 134 ÷ 230 | −206 ÷ −120 | 74 ÷ 130 |
| 14 | 244 ÷ 412 | 148 ÷ 252 | −206 ÷ −120 | −74 ÷ 130 |
| 15 | 414 ÷ 814 | 413 ÷ 733 | 13 ÷ 27 | −156 ÷ −90 |
| 16 | 304 ÷ 516 | 213 ÷ 361 | 13 ÷ 27 | −79 ÷ −43 |
| 17 | 274 ÷ 464 | 213 ÷ 361 | 13 ÷ 27 | −79 ÷ −43 |
| 18 | 274 ÷ 464 | 224 ÷ 380 | −284 ÷ −166 | 90 ÷ 156 |
| 19 | 244 ÷ 412 | 149 ÷ 255 | −284 ÷ −166 | 90 ÷ 156 |

The present invention uses the macroparameters in a manner different from that described in the above-cited paper by P. Cosi and E. Magno Caklognetto, since the values of the macroparameters do not represent an absolute measure, but a difference with respect to the neutral position defined in the MPEG-4 standard (the intensities of macroparameters may therefore take up positive and negative values). In other terms, the standard defines a neutral position for a facial model and in such a position all the intensities of the macroparameters are zero. Intensities of macroparameters characterizing the visemes indicate a difference with respect to such neutral position and the positive or negative sign indicate that the concerned elements are moving away from or closer to the neutral position. The values of the macroparameters and of the facial animation parameters, to be described below, are expressed in the so called "Facial Animation Parameter Units" (FAPU) which are normalized measurement units, characteristic of the individual parameters, described in that standard. The possibility of choosing the intensities within an interval results in an improved system flexibility.

The macroparameters are in turn split into facial animation parameters (FAP) MPEG-4. The conversion from macroparameter into facial animation parameters is carried out by identifying which parameters form a given macroparameter and the respective intensities. For instance, macroparameter LP (lip protrusion) is created through the facial animation parameters "push b lip" and "push t lip", which define the bottom lip and the top lip protrusion, respectively.

By definition, the facial animation parameters are independent of the facial model used by the MPEG-4 terminal and therefore such a system allows the animation of any facial model complying with MPEG-4.

Table 4 show the splitting of the previous macroparameters into MPEG-4 FAPs. The "x" variable represents the value of the parameter derived from Table 3. Column in Table 4 "Intensity Interval" shows the value interval within which the intensity of each MPEG-4 FAP can be chosen. The adoption of a value interval is due to the same considerations set forth about the use of a value interval for macroparameters.

We claim:

1. A method for the animation, driven by an audio signal, of a synthesized model of a human face, wherein a driving signal is converted into phonetic information readable by a machine and such phonetic information comprising individual phonetic information items is directly transformed into a predetermined group of parameters representative of elementary deformations to be directly applied to such a model through the following sequence of operations:

(a) sequentially and directly associating said individual phonetic information items, one by one with respective information items in the form of visemes representative of a corresponding position of a mouth of the model, the visemes being chosen from within a set that includes visemes independent of a language of the driving audio signal and visemes specific for such a language;

(b) splitting each viseme into a plurality of macroparameters that characterize shapes and positions of the lip region and of the jaw in the model, and associationg said plurality of macroparameters of a given viseme with intensity values representative of displacements from a neutral position and chosen within a interval determined in an initialization phase so as to ensure a good maturalness of the animated model; and (c) splitting said plurality of macroparameters into said predetermined group of parameters representative of deformations to be applied to the model, said predetermined group of parameters being chosen within a group of standard facial animation parameters relating to the mouth movements, each of said parameters being associated with intensity values which depend on the intensity values of the macroparameters and being chosen within an interval designed to guarantee the naturalness of the animated model, said group of visemes independent of the language and said group of standard facial animation parameters being the visemes and the facial animation parameters respectively defined by an ISO-IEC standard.

2. The method according to claim 1 wherein said macroparameters represent:

a vertical distance between lips, LOH;

a jaw opening, JY;

a mouth width, LOW; and a lip protrusion, LP;

the intensities of the macroparameters for the standard visemes being within the following intervals:

| Viseme Index | Phonemes | LOH | JY | LOW | LP |
| --- | --- | --- | --- | --- | --- |
| 1 | p, b, m | −88 ÷ −64 | 4 ÷ 12 | 14 ÷ 30 | 10 ÷ 22 |
| 2 | f, v | 58 ÷ 102 | 4 ÷ 15 | 66 ÷ 114 | 86 ÷ −46 |
| 3 | T, D | 188 ÷ 320 | 18 ÷ 36 | 13 ÷ 27 | 4 ÷ 12 |
| 4 | t, d | 225 ÷ 385 | 215 ÷ 365 | 53 ÷ 95 | −74 ÷ −40 |
| 5 | k, g | 107 ÷ 185 | 9 ÷ 21 | 116 ÷ 200 | 2 ÷ 8 |
| 6 | tS, dZ, S | 353 ÷ 613 | 328 ÷ 568 | 13 ÷ 27 | 71 ÷ 125 |
| 7 | s; z | 203 ÷ 345 | 168 ÷ 286 | 19 ÷ 39− | 2 ÷ 6 |
| 8 | n, I | 28 ÷ 52 | 4 ÷ 12 | 14 ÷ 30 | 10 ÷ 22 |
| 9 | r | 42 ÷ 78 | 4 ÷ 12 | 22 ÷ 42 | 17 ÷ 35 |
| 10 | A: | 304 ÷ 516 | 274 ÷ 464 | 28 ÷ 52 | −79 ÷ −43 |
| 11 | e | 274 ÷ 464 | 182 ÷ 310 | 28 ÷ 52 | −79 ÷ −43 |
| 12 | I | 244 ÷ 412 | 182 ÷ 310 | 28 ÷ 52 | 28 ÷ 52 |
| 13 | Q | 244 ÷ 412 | 134 ÷ 230 | −206 ÷ −120 | 74 ÷ 130 |
| 14 | U | 244 ÷ 412 | 148 ÷ 252 | −206 ÷ −120 | 74 ÷ 130 | the intensity values being expressed in units of facial animation as defined by the ISO-IEC standard 14496.

3. The method according to claim 2 wherein said visemes specific for the language are visemes associated to phonetic information relating to stressed vowels and the intensities of the macroparameters for the language-specific visemes specific are chosen within the following intervals:

| Viseme Index | Phonemes | LOH | JY | LOW | LP |
| --- | --- | --- | --- | --- | --- |
| 15 | a | 414 ÷ 814 | 413 ÷ 733 | 13 ÷ 27 | −156 ÷ −90 |
| 16 | E | 304 ÷ 516 | 213 ÷ 361 | 13 ÷ 27 | −79 ÷ −43 |
| 17 | i | 274 ÷ 464 | 213 ÷ 361 | 13 ÷ 27 | −79 ÷ −43 |
| 18 | 0 | 274 ÷ 464 | 224 ÷ 380 | −284 ÷ −166 | 90 ÷ 156 |
| 19 | u | 244 ÷ 412 | 149 ÷ 255 | −284 ÷ −166 | 90 ÷ 156. |

4. The method according to claim 3 wherein for splitting the macroparameters the following facial animation parameters FAP are used:

| | FAP Name |
| --- | --- |
| a) Macroparameter LOH ISO/IEC FAP Index | |
| 4 | lower t midlip |
| 5 | raise b midlip |
| 8 | lower t lip lrn |
| 9 | lower t lip rm |
| 10 | raise b lip im |
| 11 | raise b lip rm |

-continued

| | FAP Name |
|---|---|
| 12 | raise l cornerlip |
| 13 | raise r cornerlip |
| 51 | lower t midlip o |
| 52 | raise b midlip o |
| 55 | lower t lip lm o |
| 56 | lower t lip rm o |
| 57 | raise b lip lm o |
| 58 | raise b lip rm o |
| 59 | raise l cornerlip |
| 60 | raise r cornerlip |
| b) Macroparameter JY ISOBEC FAP Index | |
| 3 | open jaw |
| c) Macroparameter LP ISOIEC FAP Index | |
| 16 | push b lip |
| 17 | push t lip |
| d) Macroparameter LOW ISO/IEC FAP Index | |
| 6 | stretch l cornerlip |
| 7 | stretch r cornerlip |
| 53 | stretch l cornerlip o |
| 54 | stretch r cornerlip o. |

5. The method according to claim 4 wherein the facial animation parameters are associated with the following intensity values:

| | Intensity-Interval. |
|---|---|
| a) Macroparameter LOH ISOAEC FAP Index | |
| 4 | $3/20x \div -1/20x$ |
| 5 | $-x \div -8/10x$ |
| 8 | $-1/10x \div 0$ |
| 9 | $-1/10x \div 0$ |
| 10 | $-9/10x \div -7/10x$ |
| 11 | $-9/10x \div -7/1x$ |
| 12 | $-1/2x \div -1/4x$ |
| 13 | $-1/2x \div -1/4x$ |
| 51 | $-3/20x \div -1/20x$ |
| 52 | $-x \div -8/10x$ |
| 55 | $-1/10x \div 0$ |
| 56 | $-1/10x \div 0$ |
| 57 | $-9/10x \div -7/10x$ |
| 58 | $-9/10x \div -7/10x$ |
| 59 | $-1/2x \div -1/4x$ |
| 60 | $-1/2x \div -1/4x$ |
| b) Macroparameter JY ISO/IEC FAP Index | |
| 3 | $9/10x \div 11/10x$ |
| c) Macroparameter LP ISO/IEC FAP Index | |
| 16 | $9/10x \div 11/10x$ |
| 17 | $1/20x \div 3/20x$ |

-continued

| | Intensity-Interval. |
|---|---|
| d) Macroparameter LOW ISO/IEC FAP Index | |
| 6 | $1/3x \div 2/3x \div$ |
| 7 | $1/3x \div 2/3x$ |
| 53 | $1/3x \div 2/3x$ |
| 54 | $1/3x \div 2/3x.$ |

6. An apparatus for the animation, driven by an audio signal, of a synthesized model of human face, including:

means (SY) for generating phonetic information comprising streams of individual phonetic information items representative of the driving audio signal, readable by a machine;

means (CFP) for sequentially converting said streams of individual phonetic information items into a predetermined group of parameters representative of elementary deformations to be directly applied to said model, said conversion means (CFP) being arranged for: sequentially and directly associating said individual phonetic information items, one by one, with respective information items in the form of visemes representative of a corresponding mouth position in the synthesized model, the visemes being read from a memory containing visemes independent of the language of the driving audio signal and visemes specific for such a language; splitting each viseme into a plurality of macroparameters that characterize mouth shape and positions of lips and jaw in the model; associating said plurality of macroparameters of a given viseme with intensity values representative of displacements from a neutral position and chosen within a given interval in an initialization phase, so as to guarantee a good naturalness of the animated model; and splitting said plurality of macroparameters into said predetermined group of parameters representative of deformations to be applied to such a model, said predetermined group of parameters being chosen within a group of standard facial animation parameters relating to mouth movements, each of said parameters being associated with intensity values which depend on the intensity values of the macroparameters and chosen within an interval so designed as to guarantee the naturalness of the animated model; and means (AF) for directly applying the parameters to the model, under the control of the means for generating the phonetic information, said group of visemes independent of the language and said group of standard facial animation parameters being the visemes and facial animation parameters, respectively defined by the ISO-IEC standard 14496.

* * * * *